United States Patent [19]

Shiomi et al.

[11] Patent Number: 4,811,699
[45] Date of Patent: Mar. 14, 1989

[54] SPEED REDUCTION DEVICE

[75] Inventors: Kazuyuki Shiomi; Takahiko Murata, both of Wako, Japan

[73] Assignee: Honda Giken Dabushiki Kaisha, Tokyo, Japan

[21] Appl. No.: 149,648

[22] Filed: Jan. 28, 1988

[30] Foreign Application Priority Data

Jan. 28, 1987 [JP] Japan ................................ 62-18026
Feb. 2, 1987 [JP] Japan ................................ 62-22240

[51] Int. Cl.4 ................................................ F01L 1/06
[52] U.S. Cl. .............................. 123/90.23; 123/90.6; 74/63; 74/568 R
[58] Field of Search ............. 123/90.17, 90.18, 90.23, 123/90.26, 90.6; 74/63, 567, 568 R

[56] References Cited

U.S. PATENT DOCUMENTS

| | | | |
|---|---|---|---|
| 3,033,052 | 5/1962 | Mouchon | 74/63 |
| 3,835,717 | 9/1974 | Rudolph | 74/63 X |
| 4,036,185 | 7/1977 | Key | 123/90.26 X |
| 4,697,555 | 10/1987 | Fujikawa et al. | 123/90.23 |
| 4,716,861 | 1/1988 | Fujikawa et al. | 123/90.23 X |

Primary Examiner—Willis R. Wolfe
Attorney, Agent, or Firm—Roberts, Spiecens & Cohen

[57] ABSTRACT

A speed reduction device for transmitting the rotation of a drive shaft to a driven shaft in a speed reducing manner. An eccentric cam is securely mounted on the drive shaft and has a central axis eccentrically offset from a central axis of the drive shaft, and the driven shaft is rotatably mounted in eccentrically offset relation from the drive shaft by an eccentricity equal to that of the eccentric cam. The driven shaft includes a pair of opposed surface portions which are adapted to rotate in a normally clamping and circumscribing relation with respect to the eccentric cam. When the speed reduction device is used in an intake and exhaust valve timing and actuating device of an internal combustion engine, a crank shaft serves as the drive shaft, while a follower cam associated with intake and exhaust valves serves as the driven shaft.

18 Claims, 7 Drawing Sheets

SPEED REDUCTION DEVICE

FIELD OF THE INVENTION

The present invention relates to a speed change device and more particularly to a speed reduction device in which a driven shaft is rotatively driven at one half the speed of a drive shaft, while a pair of opposed surface portions on an inner peripheral surface defining a hollow portion of the driven shaft normally ride on an eccentric cam which rotates in unison with the drive shaft.

The invention particularly relates to a speed reduction device which is incorporated in a timing and actuating device for transmitting the rotation of a crank shaft to intake and exhaust valves with speed reduction of one half for operation of the valves in an internal combustion engine.

DESCRIPTION OF THE PRIOR ART

Various types of speed reduction devices are known, such as gear mechanisms, friction mechanisms, belt or chain transmissions, link mechanisms, and the like.

A speed reduction device utilizing a gear mechanism is not easy to manufacture and is also of complicated construction, and it produces mechanical noise and vibration in service. A speed reduction device employing a friction mechanism is also not easy to manufacture and is subject to wear which causes reduction in its speed reducing function. A speed reduction device utilizing a belt or chain transmission is great in overall size and requires a large amount of space. A speed reduction device employing a link mechanism is a complicated structure.

Consequently, although the conventional speed reduction devices have advantages, they also suffer from disadvantages and in some cases, are not suitable depending upon the particular application.

For example, in the use of such a speed reduction device for the intake and exhaust valve-operating system driven by a crank shaft in an internal combustion engine, Japanese Patent Applications Nos. 150912/84 and 229906/86 disclose a transmission mechanism in which a gear and a chain is avoided, and a guide portion is provided of such a configuration that it makes two rounds of a crank shaft or an output shaft connected to the crank shaft to return to its original position, so that an interlocking mechanism guided through the guide portion causes a valve mechanism to be opened and closed.

In the above intake and exhaust valve operating system, the guide portion is complicated in shape in order to make two rounds to return to the orignal position and therefore, a number of spaces are required in the axial direction of the crank shaft; also, the interlocking mechanism guided through the guide portion moves in a complicated three dimensional motion. As a result, the intake and exhaust valves are complicated in structure as a whole and are not easily reduced in size, and further, the moving parts are subject to wear.

SUMMARY OF THE INVENTION

With the foregoing in view, it is a primary object of the present invention to provide a speed reduction device particularly for an intake and exhaust valve timing and actuating device in an internal combustion engine which is reduced in its number of parts, simple in construction, capable of being fabricated in a lightweight and small-sized structure, and further capable of reducing the noise and vibration produced during operation while being reliable in a speed reduction operation.

To accomplish the above and further objects of the invention, according to a first aspect of the invention, there is provided a speed reduction device comprising an eccentric cam having a central axis eccentrically offset from the central axis of a drive shaft and adapted to rotate about the central axis of the drive shaft in unison with the latter, and a driven shaft rotatably supported in eccentrically offset relation relative to the drive shaft with a degree of eccentricity equal to that of the eccentric cam with respect to the drive shaft and having a pair of opposed surface portions on an inner peripheral surface defining a hollow portion, said opposed surface portions being adapted to rotate in a normally clamping and circumscribing relation relative to the eccentric cam as the drive shaft rotates.

With such a construction, as the drive shaft rotates, the eccentric cam bears against one of the pair of opposed surface portions defining the hollow portion of the driven shaft to apply a force thereto which produces a torque on the drive shaft corresponding to the amount of eccentricity of the eccentric cam relative to the drive shaft. An alternating action of the pair of opposed surface portions of the driven shaft is effected by the eccentric cam in this way to cause the driven shaft to be rotatably driven with speed reduction such that the driven shaft is rotated by one half a revolution for each revolution of the drive shaft. Thus it is possible to produce a speed reduction device which is reduced in its number of parts, is of simple structure and is lightweight and of small size. Further, noise and vibration produced during operation can be reduced to a minimum and the speed reduction device is reliable in operation.

According to a second aspect of the present invention, there is provided an intake add exhaust valve timing and actuating device for internal combustion engines, comprising an eccentric cam having a central axis eccentrically offset from the central axis of a crank shaft and adapted to rotate about the central axis of the crank shaft in unison with the crank shaft, a follower cam rotatably supported in eccentrically offset relation by a distance equal to that of the eccentric cam with respect to the crank shaft, said follower cam having opposed surface portions on an inner peripheral surface defining a hollow portion, the opposed surface portions being adapted to rotate in a normally clamping and circumscribing relation on the eccentric cam as the crank shaft rotates, and a cam follower adapted to follow a cam surface on an outer peripheral surface of the follower cam to produce drive movement for opening and closing the intake and exhaust valves.

The timing and actuating device obtains the advantages of the above-described speed reduction device. In the system, the follower cam has been eccentrically displaced from the central axis of the crank shaft in the direction of reciprocation of a piston and is closer to the intake and exhaust valves by an amount corresponding to the degree of eccentricity which results in a corresponding decrease in length of of a motion transmitting mechanism which contributes to a further reduction in weight and size of the entire system.

The above and other objects, features and advantages of the invention will become apparent from the follow-

DETAILED DESCRIPTION OF PREFERRED EMBODIMENTS

Several embodiments of the present invention will now be described with reference to the accompanying drawings.

Figure 1:
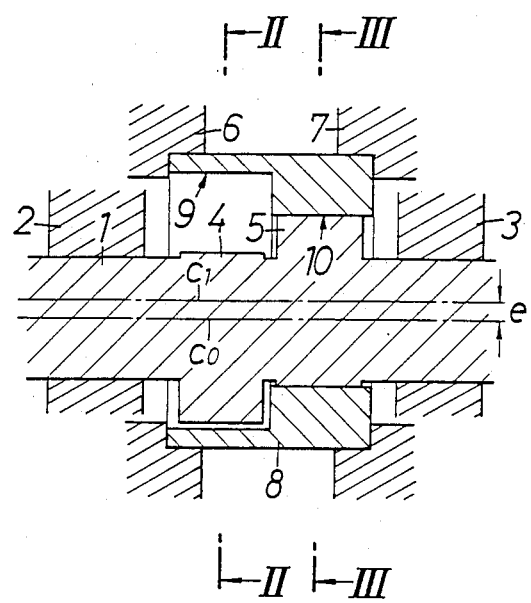
FIG. 1 is a schematic view in longitudinal section of a speed reduction device according to a first embodiment of the present invention.
Figure 2A:
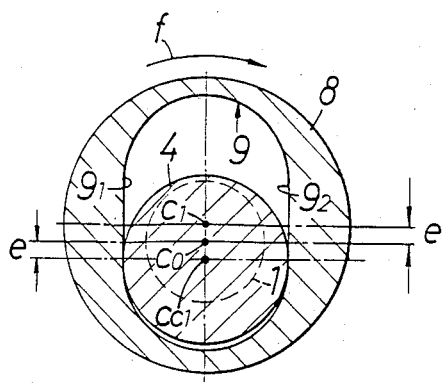
FIGS. 2(a) to 2(d) are cross-sectional views taken along line II—II in FIG. 1, sequentially illustrating the relationship between a first eccentric cam and a driven shaft in accordance with variation of the rotational angle of a drive shaft.
Figure 2B:
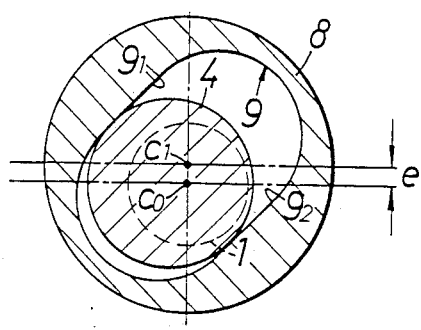
Figure 2C:
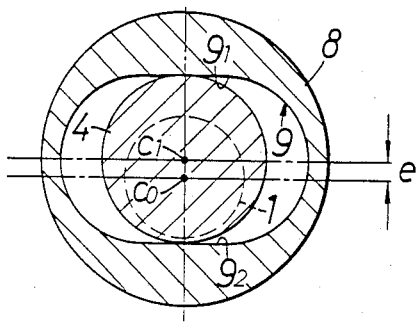
Figure 2D:
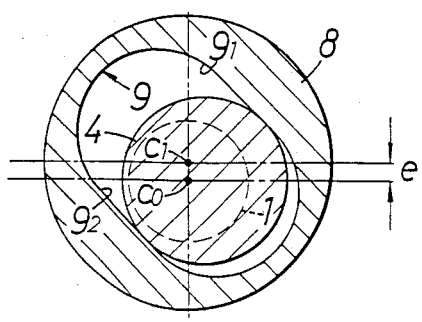
Figure 3A:
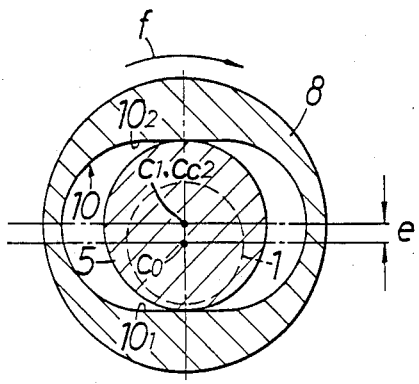
FIGS. 3(a) to 3(d) are cross-sectional views taken along line III—III in FIG. 1, sequentially illustrating the relationship between a second eccentric cam and the driven shaft in accordance with variation of the rotational angle of the drive shaft.

Referring first to FIGS. 1, 2(a)-2(d) and 3(a)-3(d) therein is seen a drive shaft 1 journaled in bearing portions 2 and 3 for rotation about a central axis $C_o$. A pair of eccentric cams 4 and 5 are secured to shaft 1 for rotation therewith in axially close proximity to each other. As shown in FIGS. 2(a) and 3(a), the eccentric cams 4 and 5 each have a cylindrical outer peripheral surface of circular section and respectively have central axes $Cc1$ and $Cc2$ eccentrically offset a distance e from the central axis $Co$ of the drive shaft 1 in diametrically opposite directions of the drive shaft 1.

A driven shaft 8 is rotatably journaled in bearing portions 6 and 7 in association with the positions of the individual eccentric cams 4 and 5 and has a central axis $C1$ eccentrically offset from the central axis $Co$ of the drive shaft 1 by the same eccentric distance e as that of the eccentric cams 4 and 5. The driven shaft 8 is hollow and has two inner peripheral surfaces 9 and 10, peripheral surface 9 surrounding the outer peripheral surface of the eccentric cam 4, while the peripheral surface 10 surrounds the outer peripheral surface of the eccentric cam 5.

The inner peripheral surface 9 has a pair of parallel opposed surface portions $9_1$ and $9_2$ adapted to rotate in a normally clamping and circumscribing relation with respect to the eccentric cam 4 as the drive shaft 1 rotates, while the inner surface 10 has a pair of parallel opposed surface portions $10_1$ and $10_2$ adapted to rotate in a normally clamping and circumscribing relation with respect to the eccentric cam 5 as the drive shaft 1 rotates. The term "clamping and circumscribing relation" refers to a snug embracing engagement of the opposed surface portions with the periphery of the associated cam such that rotation of the cam will produce corresponding rotation of the opposed surface portions and thus of the driven shaft. In the particular embodiment, the distance between the parallel, opposed surface portions is equal to the diameter of the associated cam so that the parallel opposed surface portions "clamp" or retain the periphery of the cam and produce following rotation of the driven shaft as the cam rotates. Hence, as the cam rotates eccentrically, it will cause the eccentrically supported driven shaft to rotate while the opposed surface portions ride on the cam.

The individual opposed surface portions $9_1$ and $9_2$ of the inner surface 9 and the individual opposed surface portions $10_1$ and $10_2$ of the inner surface 10 extend at right angles to one another.

Figure 3B:
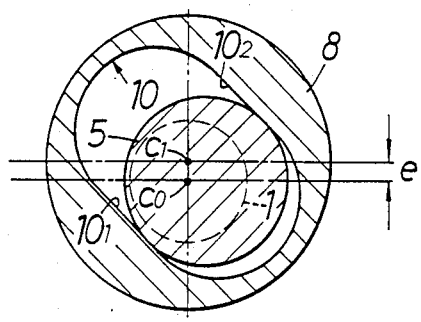
Figure 3C:
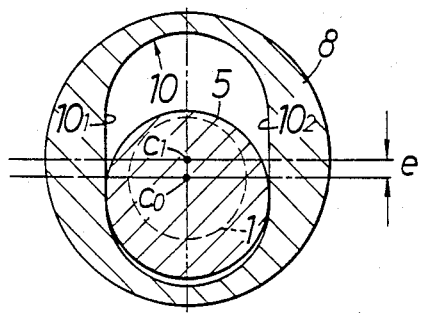
Figure 3D:
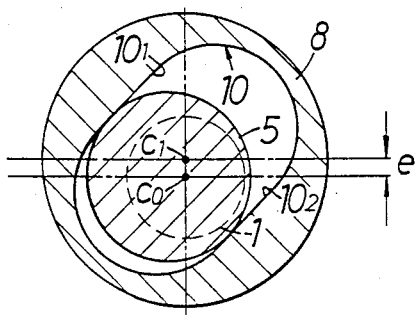

Referring to FIGS. 2(a) and 3(a), the opposed surface portions $9_1$ and $9_2$ extend vertically when the eccentric cam 4 is in a downwardly eccentric position and at this time the eccentric cam 5 is in an upwardly eccentric position and the opposed surface portions $10_1$ and $10_2$ extend horizontally. When the drive shaft 1 rotates in the direction indicated by arrow f in this condition, each of the eccentric cams 4 and 5 urges the opposed surface portion to transmit a torque to the driven shaft 8 on that one of each pair of circumscription lines between each pair of the opposed surface portions and each eccentric cam which is increasing in distance from the central axis $Co$ of the drive shaft 1. Specifically, the eccentric cam 4 acts against the opposed surface portion $9_1$, and the eccentric cam 5 acts against the opposed surface portion $10_1$. When the eccentric cams 4 and 5 consequently rotate through 90° in the direction f, the driven shaft 8 rotates through 45° in the same direction as shown in FIGS. 2(b) and 3(b). The eccentric cam 4 further continues to act against the opposed surface portion $9_1$, while the eccentric cam 5 continues to act against the opposed surface portion $10_1$. Then, when the rotation of the eccentric cams 4 and 5 has progressed through an angle of 180°, the driven shaft 8 has advanced through an angle of 90° as shown in FIGS. 2(c) and 3(c). At this point, when the eccentric cams 4 and 5 further rotate, the cam 4 starts to act against the opposed surface portion $9_2$, while the cam 5 continues to act on the opposed surface portion $10_1$. When the rotation of the eccentric cams 4 and 5 has advanced to an angle of 270°, the driven shaft 8 has rotated through 135° as shown in FIGS. 2(d) and 3(d).

It should be understood that in the present invention, the individual eccentric cams 4 and 5 may be either formed integrally with the drive shaft 1, or they may be made separately from the drive shaft 1 and then fixed thereon. In lieu of journaling the drive shaft 1 in the bearing portions 2 and 3 in the illustrated manner, the eccentric cams 4 and 5 may be fixed to an end of the drive shaft 1, and a journal means may be disposed to rotatably support the drive shaft 1 at a position inwardly of the cams. If the pair of eccentric cams are placed on the drive shaft with their maximum eccentricities diametrically opposed to one another, i.e. with their eccentric phases offset by 180° from each other, the transmission of torque to the driven shaft is effected smoothly and generation of vibration is inhibited. Alternately, if required, a single or three or more eccentric cams may be placed on the drive shaft.

In addition, provided that a pair of opposed surface portions rotate in a clamping and circumscribing relation to the eccentric cam as the drive shaft rotates, the cross-sectional configuration of the outer peripheral surface of each of the eccentric cams 4 and 5 need not be precisely circular, and the pair of opposed surface portions need not necessarily be parallel, flat surface portions. However, if the cross-sectional configuration of the outer peripheral surface of each of the eccentric cams 4 and 5 is circular and the pair of opposed surface portions are parallel, flat surface portions, as in this embodiment, this has the advantage that the parts are easily manufactured and smooth rotation of the driven shaft is achieved.

Alternatively, the driven shaft 8 may be a cam follower with an outer peripheral surface formed as a cam surface, and may have, at only one end thereof, a hollow portion with a pair of opposed surface portions formed on an inner peripheral surface defining the hollow portion.

FIGS. 4–7 illustrate an intake and exhaust valve timing and actuating device of an internal combustion engine in which the speed reduction device of FIGS. 1, 2a–2d and 3a–3d has been incorporated.

Figure 4:
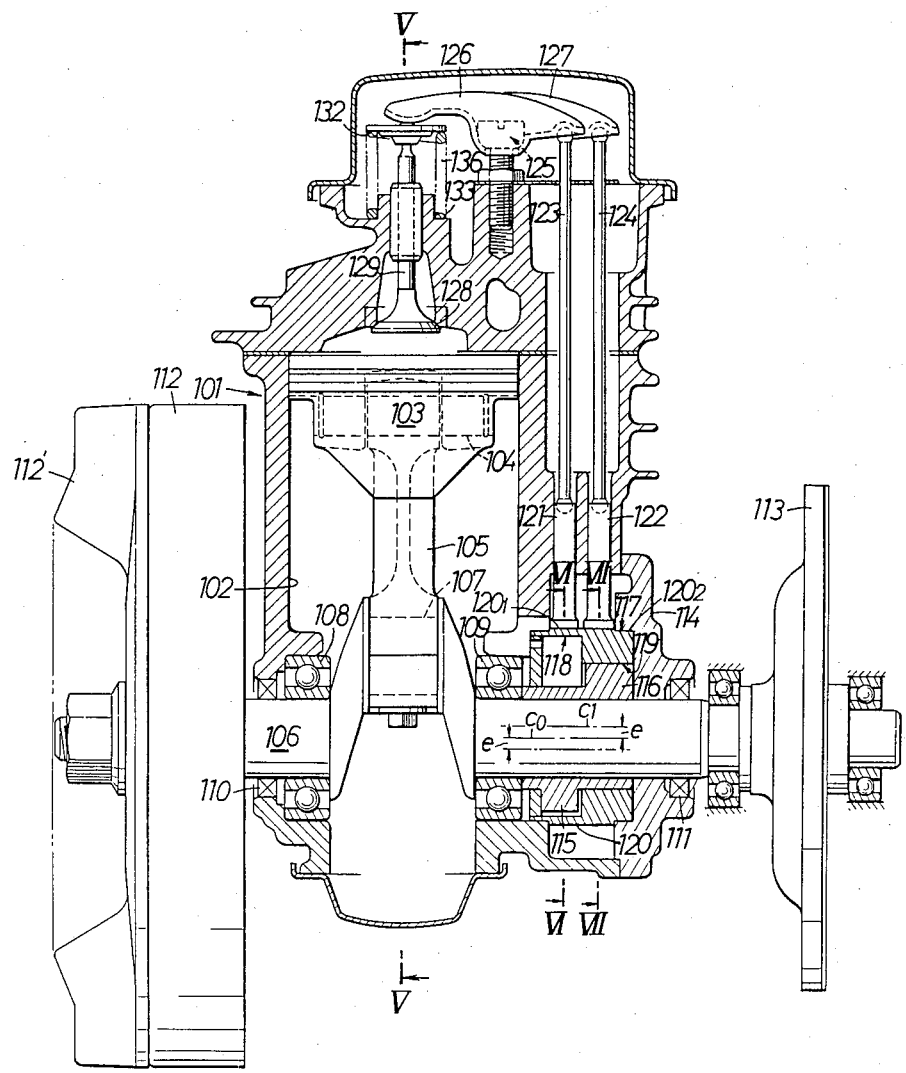
FIG. 4 is a longitudinal sectional view illustrating an internal combustion engine equipped with an intake and exhaust valve timing and actuating device according to a second embodiment of the present invention.
Figure 5:
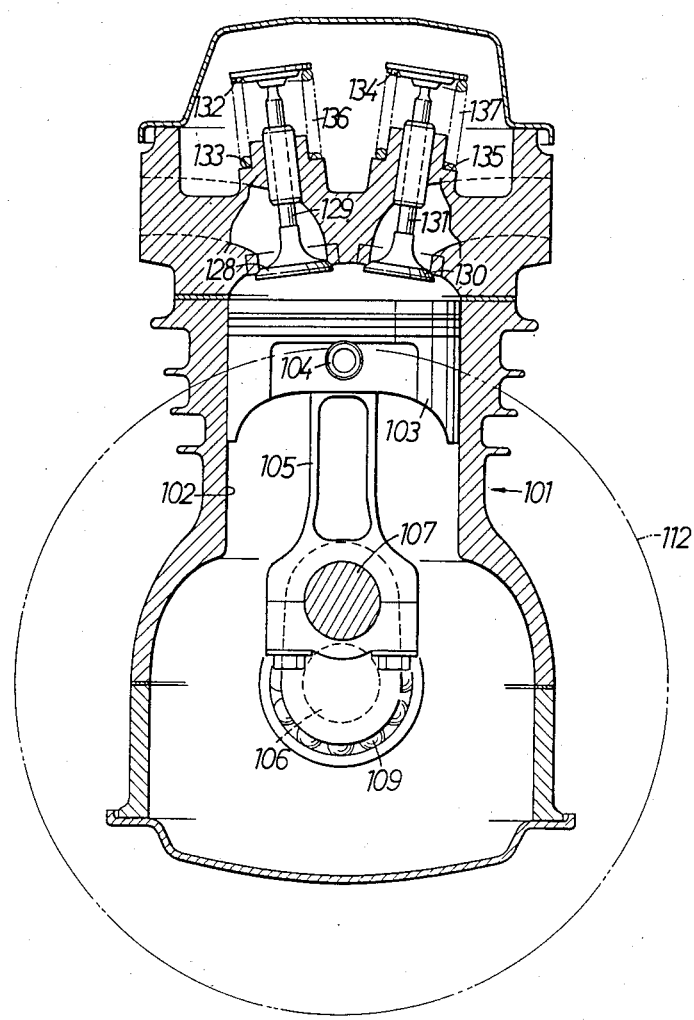
FIG. 5 is a cross sectional view taken along line V—V in FIG. 4.

Referring to FIGS. 4 and 5, a connecting rod 105 is pivotably connected at its smaller end by a piston pin 104 to a piston 103 slidably received in a cylinder bore 102 defined in a cylinder block 101 of an internal combustion engine, and at its large end the connecting rod is pivotably connected by a crank pin 107 to a crank which is adapted to rotate in unison with a crank shaft 106 which serves as a drive shaft according to the present invention The crank shaft 106 is rotatably supported in the cylinder block 101 by bearings 108 and 109 and seals 110 and 111. The crank shaft 106 has a flywheel 112 mounted at one end thereof and is fitted with a cooling fan 112' thereat and at the other end the crank shaft carries a clutch plate 113.

Between the bearing 109 and a lid plate 114, a pair of eccentric cams 115 and 116 are mounted on the crank shaft 106 in an axially aligned arrangement for rotation in unison with the crank shaft 106, and a follower cam 117, which serves as a driven shaft according to the present invention and circumscribes the eccentric cams 115 and 116, is rotatably supported by the cylinder block 111 and the lid plate 114 and eccentrically offset toward the piston 103 by an eccentricity e equal to that of the eccentric cams 115 and 116 with respect to the crank shaft 106.

Cam followers 121 and 122 for intake and exhaust have respective end faces which abut against cam surfaces $120_1$ and $120_2$ on the outer peripheral surface of the follower cam 117, so that axial reciprocations of the cam followers 121 and 122 produced by the follower cam 117 are transmitted respectively through push rods 123 and 124 to rocker arms 126 and 127 which swing about a spherical pivoting portion 125. As a result, the rocker arm 126 urges a valve stem 129 of an intake valve 128 against the spring force of a compression spring 136 interposed between a spring seat 132 and a shoulder 133 of the cylinder head, thereby causing the intake valve 128 to be opened or closed, while the rocker arm 127 urges a valve stem 131 of an exhaust valve 130 against the spring force of a compression spring 137 interposed between a spring seat 134 a shoulder 135 of the cylinder head, thereby causing the valve 130 to be opened or closed.

The mechanism for transmitting the rotation of the crank shaft 106 to the follower cam 117 with speed reduction of one half is that described in the first embodiment.

As shown in FIGS. 6(a) to 6(d) and 7(a) to 7(d), the eccentric cams 115 and 116 each has a cylindrical outer peripheral surface which is circular in cross-section and the cams are eccentrically offset by eccentric distances e from the central axis Co of the crank shaft 106 in diametrically opposite directions of the crank shaft 106.

The follower cam 117 has inner peripheral surfaces 118 and 119 which define a hollow portion for the follower cam 117. The follower cam 117 is supported for rotation in cylinder block 101 about a central axis C1 eccentrically offset by the distance e from the central axis Co of the crank shaft 106 such that inner peripheral surfaces 118, 119 surround the outer peripheral surfaces of the eccentric cams 115 and 116 respectively.

The inner peripheral surface 118 has a pair of parallel opposed surface portions $118_1$ and $118_2$ which are adapted to rotate in a normally clamping and circumscribing relation with respect to the eccentric cam 115 as the crank shaft 106 rotates, while the inner peripheral surface 119 has a pair of parallel opposed surface portions $119_1$ and $119_2$ which are adapted to rotate in a normally clamping and circumscribing relation with respect to the eccentric cam 116 as the crank shaft 106 rotates. The opposed surface portions $118_1$ and $118_2$ of the inner surface 118 and the opposed surface portions $119_1$ and $119_2$ of the inner surface 119 extend at right angles to one another.

Figure 6A:
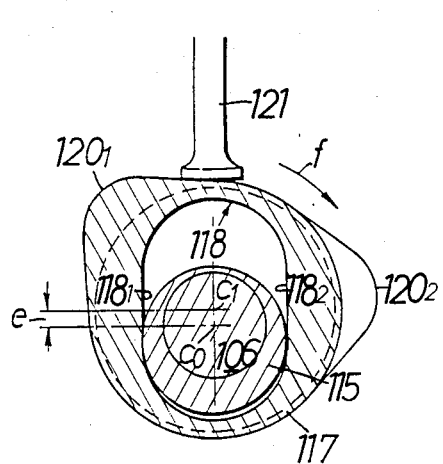
FIGS. 6(a) to 6(d) are cross sectional views taken along line VI—VI in FIG. 4 sequentially illustrating the relationship between the first eccentric cam and a follower cam in accordance with variation of the rotational angle of the crank shaft.
Figure 6B:
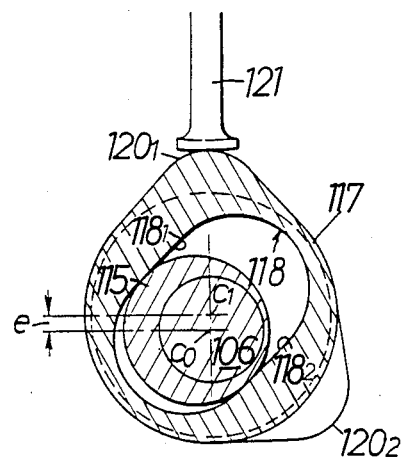
Figure 6C:
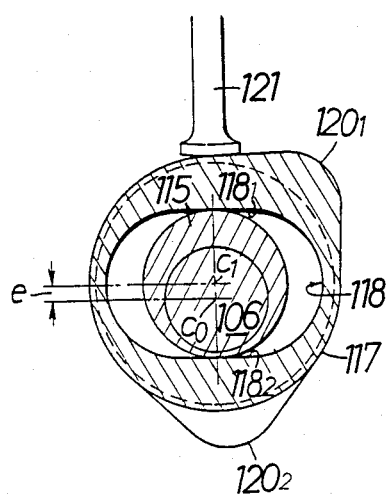
Figure 6D:
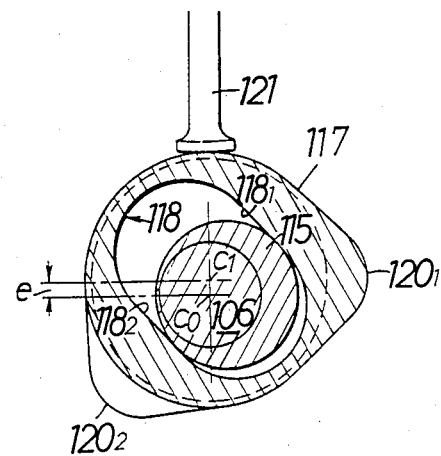
Figure 7A:
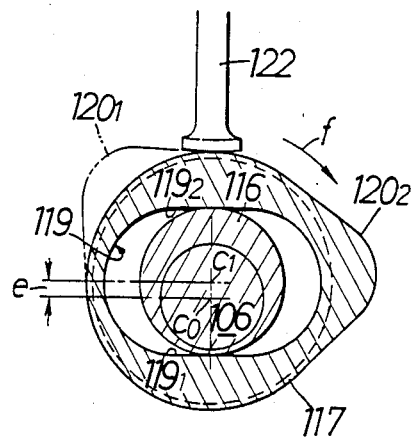
FIGS. 7(a) to 7(d) are cross sectional views taken along line VII—VII in FIG. 4 sequentially illustrating the relationship between the second eccentric cam and the follower cam in accordance with variation of the rotational angle of the crank shaft.
Figure 7B:
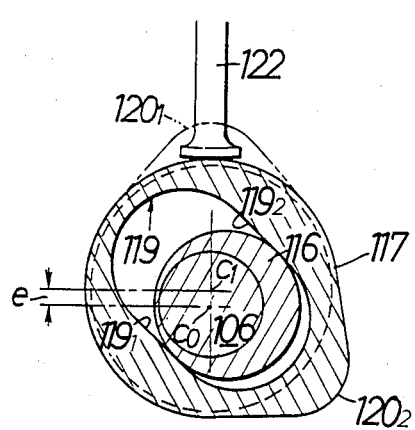
Figure 7C:
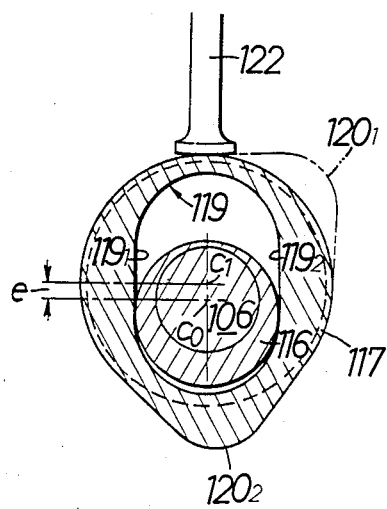
Figure 7D:
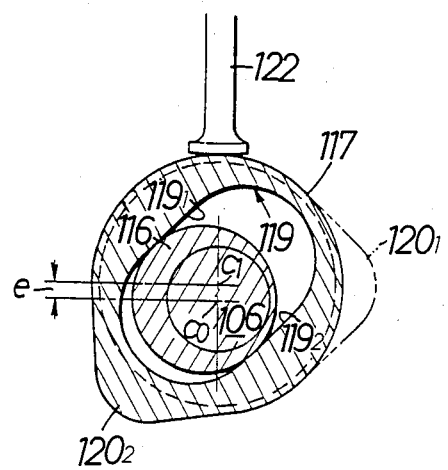

The transmission of the rotation from the crank shaft 106, serving as a drive shaft, to the follower cam 117, serving as a driven shaft, is precisely the same as described in the first embodiment and hence, as the eccentric cams 115 and 116 rotate from the positions shown in FIGS. 6(a) and 7(a) to the positions shown in FIGS. 6(d) and 7(d) in coordination with the rotation of the crank shaft 106, the follower cam 117 abutting at opposed surface portions $118_1$, $118_2$ and $119_1$, $119_2$ thereof respectively against the eccentric cams 115 and 116 is rotatively driven at a speed reduction of one half of the speed of the crank shaft 106 by the torque received from these abutting portions.

The present invention has been applied to an overhead valve-type internal combustion engine in the second embodiment, and it should be understood that the speed reduction device according to the present invention can be also applied to other types as well, for example, to a side valve-type internal combustion engine. Additionally, the construction can be one in which the cam follower directly operates the intake and exhaust valves.

From the above it is seen that the invention provides a method and device for driving the intake and exhaust valves of an internal combustion engine from the crank shaft of the engine with speed reduction by rotating an eccentric cam with the crank shaft around the axis of rotation of the crank shaft and driving a follower cam in rotation at reduced speed by engaging the periphery of the cam with two opposed surfaces formed on the follower cam, the follower cam being supported for rotation about an axis offset from the axis of rotation of the crankshaft by a distance equal to the eccentricity of the eccentric cam relative to the drive shaft. The engagement of the cam by the two opposed surfaces of the follower cam produces rotation of the follower cam with said speed reduction as said cam rotates and rides on said opposed surfaces. The rotation of the follower cam is transmitted to the intake and exhaust valves of the engine as reciprocation movement of the valves between their respective open and closed states.

In a broad sense, the invention provides speed change between a drive shaft and a driven shaft by securing the eccentric cam on one of the shafts for rotation therewith about the central axis of said one shaft and by providing means on the other of the shafts defining a hollow portion having an inner peripheral surface with opposed surface portions engaging the cam for rotating in a circumscribing relation on the cam upon relative rotation of said shafts.

Although the invention has been described in relation to particular embodiments thereof, it will become apparent to those skilled in the art that numerous modifications and variations can be made within the scope and spirit of the invention.

What is claimed is:

1. A speed reduction device comprising:
   an eccentric cam having a central axis eccentrically offset from a central axis of a drive shaft and adapted to rotate about the central axis of said drive shaft in unison with said drive shaft; and
   a driven shaft rotatably supported in eccentrically offset relation relative to said drive shaft by an eccentricity equal to that of said eccentric cam with respect to said drive shaft, said driven shaft having a pair of opposed surface portions on an inner peripheral surface defining a hollow portion, said opposed surface portions being engaged to rotate in a normally clamping and circumscribing relation to said eccentric cam as said drive shaft rotates.

2. A speed reduction device according to claim 1, comprising a second eccentric cam mounted on said drive shaft in an axially aligned relation with the first said cam, said driven shaft having a second pair of opposed surface portions in association with said second eccentric cam, said first and second eccentric cams having central axes which are eccentrically offset in different angular directions with respect to the central axis of said drive shaft.

3. A speed reduction device according to claim 2, wherein said first and second eccentric cams have their central axes eccentrically offset in diametrically opposite directions from the central axis of said drive shaft, said first and second pairs of opposed surface portions circumscribing said eccentric cams and extending at right angles to one another.

4. A speed reduction device according to claim 1 wherein said opposed surface portions extend parallel to one another and produce one-half revolution of the driven shaft for each revolution of said eccentric cam.

5. A speed reduction device according to claim 4 wherein said cam has a circular periphery and said opposed surface portions are planar.

6. An intake and exhaust valve timing and actuating device for an internal combustion engine, comprising:
   an eccentric cam having a central axis eccentrically offset from a central axis of a crank shaft and adapted to rotate about the central axis of said crank shaft in unison with said crank shaft;
   a follower cam rotatably supported in eccentrically offset relation relative to said crank shaft by an eccentricity equal to that of said eccentric cam with respect to the crank shaft, said follower cam having opposed surface portions on an inner peripheral surface defining a hollow portion, said opposed surface portions being engaged to rotate in a normally clamping and circumscribing relation to said eccentric cam as said crank shaft rotates; and
   a cam follower engaged to follow a cam surface on an outer peripheral surface of said follower cam to produce motion for opening and closing intake and exhaust valves.

7. An intake and exhaust valve timing and actuating device according to claim 6, wherein said follower cam is eccentrically offset from the central axis of said crank shaft in the direction of reciprocation of a piston of the engine.

8. An intake and exhaust valve timing and actuating device according to claim 6 comprising a second eccentric cam mounted on said crank shaft in an axially aligned arrangement with the first said cam, said follower cam having a second pair of opposed surface portions in association with said second eccentric cam, said first and second eccentric cams having central axes eccentrically offset from one another in different angular directions with respect to the central axis of said crank shaft.

9. An intake and exhaust valve timing and actuating device according to claim 8, wherein said first and second eccentric cams have their central axes eccentrically offset in diametrically opposite directions from the central axis of said crank shaft, said first and second pairs of opposed surface portions circumscribing said eccentric cams and extending at right angles to one another.

10. An intake and exhaust valve timing and actuating device according to claim 6 wherein said opposed surface portions extend parallel to one another and produce one half revolution of said follower cam for each revolution of said crank shaft.

11. A speed reduction device according to claim 10 wherein said cam has a circular periphery and said opposed surface portions are planar.

12. A speed change device comprising a drive shaft having a central axis of rotation, a driven shaft having a central axis of rotation offset from said central axis of rotation of said drive shaft by a determined distance, an eccentric cam secured on one of said shafts for rotation therewith about the central axis of said one shaft, said eccentric cam having a central axis offset from said central axis of said one shaft by a distance equal to said distance of the offset of the central axis of the drive shaft and the central axis of the driven shaft, means on the other of said shafts defining a hollow portion having an inner peripheral surface with opposed surface portions engaging said cam for rotating in a circumscribing relation thereon upon relative rotation of said shafts such that for one revolution of said cam said other shaft undergoes one-half a revolution.

13. A speed change device as claimed in claim 12 wherein said eccentric cam is cylindrical and said opposed surface portions are spaced apart by a distance corresponding to the diameter of said eccentric cam.

14. A speed change device as claimed in claim 13 wherein said opposed surface portions are parallel to one another.

15. A speed change device as claimed in claim 14 wherein said opposed surface portions are planar.

16. A method of driving the intake and exhaust valves of an internal combustion engine from a crank shaft of the engine with speed reduction, said method comprising rotating an eccentric cam with the crank shaft around the axis of rotation of the crank shaft, engaging the periphery of the cam with two opposed surfaces formed on a follower cam which is supported for rotation about an axis offset from the axis of rotation of the crank shaft by a distance equal to the eccentricity of the eccentric cam relative to said drive shaft, the engagement of said cam by said two opposed surfaces producing rotation of said follower cam with speed reduction as said cam rotates and rides on said opposed surfaces, and transmitting the rotation of said follower cam to intake and exhaust valves of the engine as reciprocation movement of said valves between respective open and closed states.

17. A method as claimed in claim 16 comprising producing said speed reduction so that said follower cam undergoes one-half revolution as said crank shaft undergoes one revolution.

18. A method as claimed in claim 16 comprising rotating a second eccentric cam with said crank shaft in an angular position offset 180° relative to the first said eccentric cam, and engaging the second eccentric cam with two further opposed surfaces formed on the follower cam to supplement the rotational effect produced on the follower cam by said first cam.

* * * * *

UNITED STATES PATENT AND TRADEMARK OFFICE
CERTIFICATE OF CORRECTION

PATENT NO. : 4,811,699

DATED : March 14, 1989

INVENTOR(S) : Shiomi, Kazuyuki and Murata, Takahiko

It is certified that error appears in the above-identified patent and that said Letters Patent are hereby corrected as shown below:

On the title page, item [73],

The correct name of the assignee is:

Honda Giken Kogyo Kabushiki Kaisha

Signed and Sealed this

Fourteenth Day of November, 1989

Attest:

JEFFREY M. SAMUELS

*Attesting Officer*  *Acting Commissioner of Patents and Trademarks*